(12) United States Patent
Gao et al.

(10) Patent No.: US 12,025,697 B2
(45) Date of Patent: Jul. 2, 2024

(54) DUAL-POLARIZED PHASED ARRAY ANTENNA AND DUAL-POLARIZED PHASED ARRAY WEATHER RADAR

(71) Applicant: Meteorological Observation Centre of China Meteorological Administration, Beijing (CN)

(72) Inventors: Yuchun Gao, Beijing (CN); Chen Li, Beijing (CN); Yubao Chen, Beijing (CN); Hu Chen, Beijing (CN); Changxing Li, Beijing (CN); Jianbing Lu, Beijing (CN); Haihe Liang, Beijing (CN); Yingchun Chen, Beijing (CN); Xiaopeng Wang, Beijing (CN); Zhichao Bu, Beijing (CN); Xu Han, Beijing (CN); Nan Shao, Beijing (CN)

(73) Assignee: Meteorological Observation Centre Of China Meteorological Administration, Beijing (CN)

( * ) Notice: Subject to any disclaimer, the term of this patent is extended or adjusted under 35 U.S.C. 154(b) by 615 days.

(21) Appl. No.: 17/210,103

(22) Filed: Mar. 23, 2021

(65) Prior Publication Data

US 2021/0389454 A1    Dec. 16, 2021

(30) Foreign Application Priority Data

Jun. 12, 2020   (CN) .......................... 202010533983.0

(51) Int. Cl.
*G01S 13/95* (2006.01)
*G01S 7/282* (2006.01)
(Continued)

(52) U.S. Cl.
CPC .............. *G01S 13/95* (2013.01); *G01S 7/282* (2013.01); *G01S 7/295* (2013.01); *H01Q 9/045* (2013.01);
(Continued)

(58) Field of Classification Search
CPC .......... G01S 13/95; G01S 7/282; G01S 7/295; H01Q 9/045; H01Q 13/12; H01Q 15/24; H01Q 21/065
(Continued)

(56) References Cited

U.S. PATENT DOCUMENTS 4,413,263 A * 11/1983 Amitay ................ H01Q 3/2658
343/756
5,208,601 A * 5/1993 Hart ...................... G01S 13/913
342/7
(Continued)

FOREIGN PATENT DOCUMENTS

EP       3352299 A1 *  7/2018  ............. H01Q 21/06

*Primary Examiner* — Nuzhat Pervin
(74) *Attorney, Agent, or Firm* — Patterson + Sheridan, LLP (57) ABSTRACT

The present disclosure relates to a dual-polarized phased array antenna and a dual-polarized phased array weather radar. According to the dual-polarized phased array antenna, a plurality of dual-polarized row feeds are arranged on a horizontal cylindrical support surface to form a dual-polarized antenna in a horizontal cylindrical shape. This allows two polarized signals in a horizontal direction and a vertical direction to be simultaneously received and transmitted, and ensures digital multi-beam signals with constant beam bandwidth, antenna gain, and dual polarization performance. The dual-polarized phased array weather radar provided in the present disclosure uses the formed dual-polarized microstrip patch antenna or a dual-polarized waveguide slot antenna in the horizontal cylindrical shape. This can ensure consistency of weather detected at different scan angles, and improve the accuracy of weather target 3D construction. In addition, this can simplify the calibration requirement of an existing phased array weather radar.

18 Claims, 10 Drawing Sheets

(51) Int. Cl.
*G01S 7/295* (2006.01)
*H01Q 9/04* (2006.01)
*H01Q 13/12* (2006.01)
*H01Q 15/24* (2006.01)
*H01Q 21/06* (2006.01)

(52) U.S. Cl.
CPC ............. *H01Q 13/12* (2013.01); *H01Q 15/24* (2013.01); *H01Q 21/065* (2013.01)

(58) Field of Classification Search
USPC ........................................................ 342/188
See application file for complete search history.

(56) References Cited

U.S. PATENT DOCUMENTS

| | | | | |
|---|---|---|---|---|
| 7,436,361 B1* | 10/2008 | Paulsen | ............. | H01Q 21/0043 343/771 |
| 8,098,189 B1* | 1/2012 | Woodell | ............. | G01S 7/025 342/26 B |
| 8,558,735 B2* | 10/2013 | Bachmann | ............. | G01S 7/025 342/361 |
| 9,070,964 B1* | 6/2015 | Schuss | ............. | H01Q 25/00 |
| 9,182,485 B1* | 11/2015 | Andrews | ............. | G01S 13/426 |
| 9,599,704 B2* | 3/2017 | Mitchell | ............. | G01S 13/66 |
| 9,715,609 B1* | 7/2017 | Fink | ............. | H01Q 25/00 |
| 9,778,357 B2* | 10/2017 | Zhang | ............. | H01Q 3/26 |
| 9,817,114 B2* | 11/2017 | Shylo | ............. | G01K 11/006 |
| 9,848,391 B2* | 12/2017 | Jalali | ............. | H01Q 1/246 |
| 9,972,917 B2* | 5/2018 | Vacanti | ............. | G01S 13/4463 |
| 10,135,122 B2* | 11/2018 | Apostolos | ............. | H01Q 1/243 |
| 10,281,571 B2* | 5/2019 | Brookner | ............. | G01S 13/95 |
| 10,418,723 B1* | 9/2019 | Livadaru | ............. | H01Q 1/38 |
| 10,425,910 B1* | 9/2019 | Pajovic | ............. | G01S 5/02521 |
| 10,551,490 B2* | 2/2020 | Qi | ............. | G01S 7/03 |
| 10,578,707 B2* | 3/2020 | Kim | ............. | G01S 13/931 |
| 10,651,544 B2* | 5/2020 | Xia | ............. | H04M 1/026 |
| 10,892,550 B2* | 1/2021 | Topak | ............. | H01Q 21/061 |
| 11,061,127 B2* | 7/2021 | Klotzbuecher | ............. | G01S 13/726 |
| 11,594,812 B2* | 2/2023 | Anderson | ............. | H01Q 1/42 |
| 2010/0141527 A1* | 6/2010 | Lalezari | ............. | H01Q 21/08 342/368 |
| 2011/0205119 A1* | 8/2011 | Timofeev | ............. | H01Q 25/002 342/373 |
| 2011/0285582 A1* | 11/2011 | Zhang | ............. | G01S 7/024 342/175 |
| 2011/0291878 A1* | 12/2011 | Mclaughlin | ............. | H01Q 19/132 343/766 |
| 2012/0044105 A1* | 2/2012 | Bachmann | ............. | G01S 7/025 342/188 |
| 2015/0192671 A1* | 7/2015 | Zhang | ............. | G01S 13/95 342/188 |
| 2015/0222025 A1* | 8/2015 | Song | ............. | H01Q 21/24 343/893 |
| 2016/0054439 A1* | 2/2016 | Brookner | ............. | G01S 13/91 342/36 |
| 2017/0311307 A1* | 10/2017 | Negus | ............. | H01Q 21/24 |
| 2019/0237874 A1* | 8/2019 | Michaelis | ............. | H01Q 1/246 |
| 2019/0310358 A1* | 10/2019 | Lee | ............. | G01S 13/931 |
| 2020/0271752 A1* | 8/2020 | Keil | ............. | G01S 13/726 |
| 2020/0287298 A1* | 9/2020 | Ueda | ............. | H01Q 9/0407 |
| 2021/0328364 A1* | 10/2021 | Jia | ............. | H01Q 1/523 |
| 2022/0003925 A1* | 1/2022 | Wang | ............. | G02B 6/122 |
| 2022/0003936 A1* | 1/2022 | Wang | ............. | B81B 3/0018 |
| 2022/0011409 A1* | 1/2022 | Hosseini | ............. | G01S 17/34 |
| 2022/0045439 A1* | 2/2022 | Fillion | ............. | G10K 11/346 |
| 2022/0365208 A1* | 11/2022 | Gao | ............. | H01Q 3/242 |
| 2022/0368033 A1* | 11/2022 | Fillion | ............. | H01Q 15/10 |

\* cited by examiner

FIG. 3 Dual-polarized horizontal row feed integrated through three-dimensional stacking (a) and dual-polarized waveguide antenna row feed (b)

A. Dual-polarized subarray in a horizontal row feed

DUAL-POLARIZED PHASED ARRAY ANTENNA AND DUAL-POLARIZED PHASED ARRAY WEATHER RADAR

CROSS-REFERENCE TO RELATED APPLICATION

This application claims priority from China Patent Application No. 202010533983.0 filed Jun. 12, 2020, which application is incorporated herein by reference in its entirety.

TECHNICAL FIELD

The present disclosure relates to the field of weather detection devices, and in particular, to a dual-polarized phased array antenna and a dual-polarized phased array weather radar.

BACKGROUND

Since the advent of radar technologies, there has been increasing research on using radar for meteorological detection. Weather radar is the most effective means of detecting and pre-warning hazardous weather. Weather radar networks are established in many countries in the world, and a new generation of weather radar network is established in China. Mechanical scanning is usually adopted for weather radars used in existing services. It takes about six minutes to complete a volume scan, which is difficult to meet the detection of some fast-changing weather phenomena. Electronic scanning is adopted for phased array weather radars. The scanning speed is not limited by mechanical rotation performance, and multiple beams can operate simultaneously. Therefore, using phased array weather radars to implement rapid detection becomes the development mainstream of next-generation weather radars.

Dual polarization detection technologies can be used to obtain more parameters of meteorological targets, better identify the meteorological targets, and provide more accurate meteorological information. Therefore, adopting dual polarization detection becomes a consensus in the weather radar field. Dual-polarized phased array weather radars capable of quickly scanning are obtained by combining phased array weather radars and dual polarization technologies. The dual-polarized phased array weather radars overcome the disadvantages of existing weather radars and implement multifunctional detection.

Phased array antenna array configurations usually include one-dimensional linear arrays, two-dimensional planar arrays, and spherical arrays.

Usually, electronic scanning is conducted in azimuth or elevation in the one-dimensional linear arrays, and mechanical rotation is adopted in another dimension to complete meteorological detection in the entire airspace. A two-dimensional planar array antenna requires multiple arrays (usually three or four areas), resulting in high costs. Both the one-dimensional linear arrays and the two-dimensional planar arrays have the following characteristic: beam parameters changes nonlinearly when beam pointing deviates from the normal line. As the beam scanning angle changes, the beamwidth of the one-dimensional linear arrays or the two-dimensional planar arrays changes, the antenna gain changes, and the radar illumination volume also changes. Accordingly, the polarization direction of the beam is changed and distorted, and this change is a nonlinear change. The spherical arrays are the best in phased array radars. Beams can be flexibly controlled and are consistent in all directions. However, the spherical arrays are manufactured at the highest cost. To resolve the nonlinear changes of various parameters during planar phased array beam scanning, a phased array weather radar in a vertical cylindrical shape was proposed in the US patent "CYLINDRICAL POLARIMETRIC PHASED ARRAY RADAR" (patent number US 2011/0285582 A1) to ensure that various beam indicators remain unchanged when the radar is scanning in azimuth. However, according to this method, nonlinear beam changes still exist during scanning in elevation. In addition, the zenith direction cannot be scanned because of a limited angle of scanning in elevation.

BRIEF SUMMARY

An objective of the present disclosure is to provide a dual-polarized phased array antenna and a dual-polarized phased array weather radar to implement scanning without changes in beam performance. This effectively improves the accuracy of weather detection and target identification.

To achieve the objective, the present disclosure provides the following solutions:

A dual-polarized phased array antenna is provided, including a horizontal cylindrical support surface, a support frame, and a plurality of dual-polarized row feeds.

The support frame matches the horizontal cylindrical support surface and is configured to support the horizontal cylindrical support surface.

The plurality of dual-polarized row feeds are arranged on the horizontal cylindrical support surface. The plurality of dual-polarized row feeds are closely arranged along a circumferential direction of the horizontal cylindrical support surface.

Preferably, a digital transceiver module is further included.

The digital transceiver module includes a plurality of dual-channel digital transmit/receive (T/R) components.

Each of the dual-polarized row feeds corresponds to one of the dual-channel digital T/R components. The dual-channel digital T/R components are configured to receive and transmit signals.

Preferably, the dual-channel digital T/R component includes a digital receiving unit and a digital transmitting unit.

The digital transmitting unit is configured to generate a frequency-modulated signal or a phase-coded signal required for detecting a target. The digital receiving unit is configured to receive an echo signal reflected by the target.

Preferably, the digital transmitting unit is an all-solid-state transmitter.

Preferably, each of the dual-polarized row feeds includes a plurality of inner-row-feed subarrays. Each of the inner-row-feed subarrays includes an electronic switch and a plurality of antenna radiating elements; and The electronic switch is connected to the antenna radiating elements and configured to turn on or off the antenna radiating elements.

Preferably, a driver module is further included.

The driver module is connected to the support frame for driving the support frame to rotate horizontally.

Preferably, the driver module includes a drive motor, an angle encoder, and a motor control unit.

Both the angle encoder and the drive motor are connected to the motor control unit.

The motor control unit is configured to control the drive motor to drive the support frame to rotate to a specified angle based on angle information in the angle encoder.

A dual-polarized phased array weather radar is provided, including an information processing module and the dual-polarized phased array antenna.

The information processing module is connected to the dual-polarized phased array antenna and configured to complete spectrum analysis to obtain target echo information based on a signal received by the dual-polarized phased array antenna. The information processing module is further configured to generate a control instruction to drive the dual-polarized phased array antenna to collect signals in a horizontal direction and/or an elevation direction.

Preferably, the information processing module is connected to the electronic switch in the dual-polarized phased array antenna and configured to control the electronic switch to be on or off. The dual-polarized phased array antenna forms electronic scans at different angles in the elevation direction based on an area in which the electronic switch is turned on.

Preferably, the information processing module includes a multi-channel digital beam forming (DBF) module, a signal processing module, and a communication module.

The multi-channel DBF module is connected to the signal processing module. The signal processing module is connected to the communication module.

The multi-channel DBF module is configured to convert an echo signal received by the dual-polarized phased array antenna to a beam signal. The signal processing module is configured to perform spectrum analysis on the beam signal to obtain target echo information. The communication module is configured to send the target echo information.

According to specific examples of the present disclosure, the present disclosure has the following technical effects:

According to the dual-polarized phased array antenna provided in the present disclosure, the plurality of dual-polarized row feeds are arranged on the horizontal cylindrical support surface to form a dual-polarized microstrip patch antenna in a horizontal cylindrical shape. This allows two polarized signals in a horizontal direction and a vertical direction to be simultaneously received and transmitted, and ensures digital multi-beam signals with constant beam bandwidth, antenna gain, and dual polarization performance.

The dual-polarized phased array weather radar provided in the present disclosure uses the formed dual-polarized microstrip patch antenna in the horizontal cylindrical shape. This can ensure consistency of weather detected at different scan angles, and improve the accuracy of weather target 3D construction. In addition, this can simplify the calibration requirement of an existing phased array weather radar, and improve adaptability of the dual-polarized phased array weather radar.

BRIEF DESCRIPTION OF THE DRAWINGS

To more clearly illustrate examples of the present disclosure or technical solutions in the prior art, the accompanying drawings to be used in the examples are described briefly below. The following accompanying drawings merely illustrate some examples of the present disclosure, and other accompanying drawings can be further obtained by a person of ordinary skill in the art based on these accompanying drawings without any creative efforts.

DETAILED DESCRIPTION

The following clearly and completely describes the technical solutions in the examples of the present disclosure with reference to accompanying drawings in the examples of the present disclosure. Apparently, the described examples are merely some rather than all of the examples of the present disclosure. All other examples obtained by a person of ordinary skill in the art based on the examples of the present disclosure without creative efforts shall fall within the protection scope of the present disclosure.

An objective of the present disclosure is to provide a dual-polarized phased array antenna and a dual-polarized phased array weather radar to implement scanning without changes in beam performance. This effectively improves the accuracy of weather detection and target identification.

To make the objective, features, and advantages of the present disclosure clearer and more comprehensible, the present disclosure is further described in detail below with reference to the accompanying drawings and specific examples.

Figure 1:
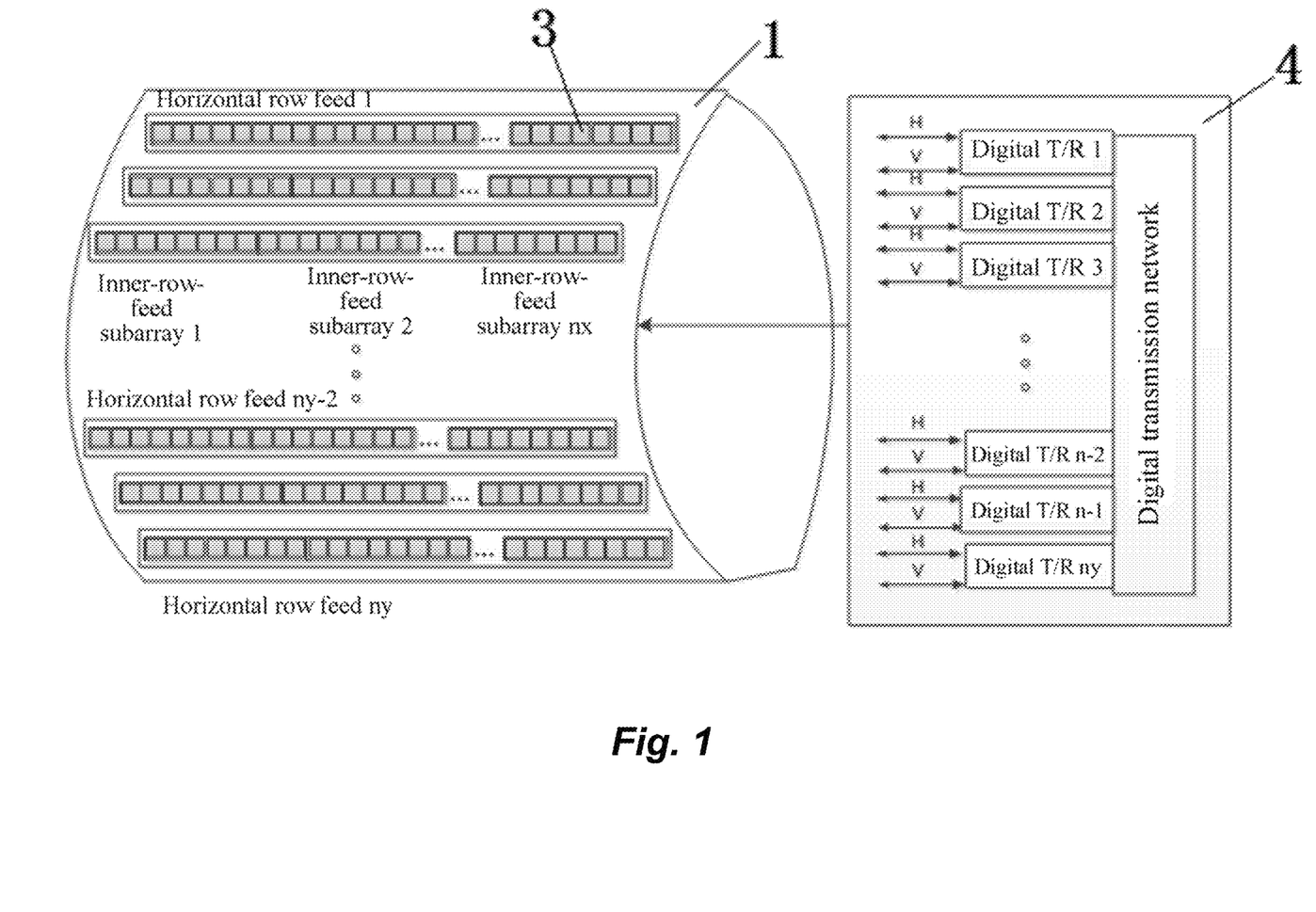
FIG. 1 is a schematic structural diagram of a dual-polarized phased array antenna according to the present disclosure.
Figure 5:
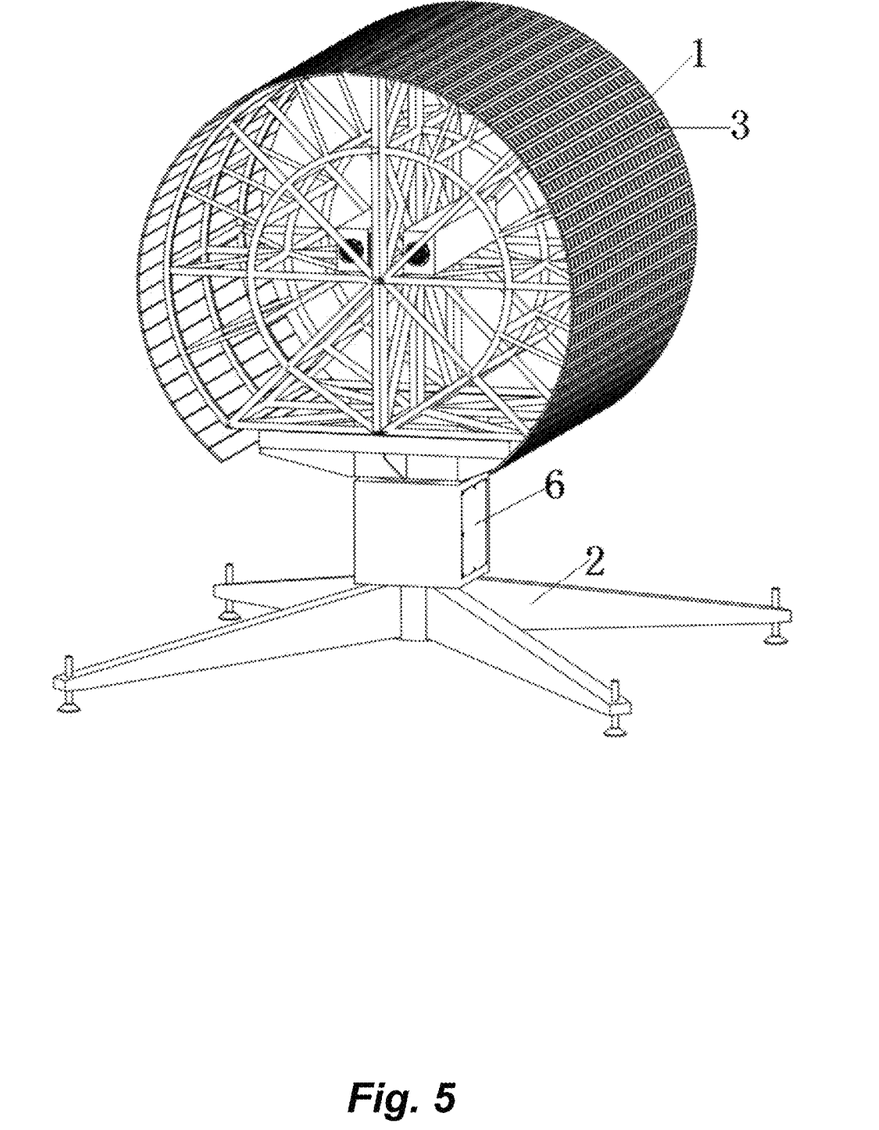
FIG. 5 is a diagram of an outline structure of a dual-polarized phased array weather radar including a dual-polarized phased array antenna according to the present disclosure.

FIG. 1 is a schematic structural diagram of a dual-polarized phased array antenna according to the present disclosure. FIG. 5 is a diagram of an outline structure of a dual-polarized phased array weather radar including a dual-polarized phased array antenna according to the present disclosure. As shown in FIG. 1 and FIG. 5, the dual-polarized phased array antenna provided in the present disclosure includes a horizontal cylindrical support surface 1, a support frame 2, and a plurality of dual-polarized row feeds 3.

The support frame 2 matches the horizontal cylindrical support surface 1 (as shown in FIG. 5). The support frame 2 is configured to support the horizontal cylindrical support surface 1.

The plurality of dual-polarized row feeds 3 are arranged on the horizontal cylindrical support surface 1. The plurality of dual-polarized row feeds 3 are closely arranged along a circumferential direction of the horizontal cylindrical support surface 1 (as shown in FIG. 1).

In a further optimization of this example of the present disclosure, the dual-polarized phased array antenna further includes a digital transceiver module 4.

The digital transceiver module 4 includes a plurality of dual-channel digital transmit/receive (T/R) components.

Each of the dual-polarized row feeds corresponds to one of the dual-channel digital T/R components. The dual-channel digital T/R components are configured to receive and transmit signals. It is equivalent that channels of the digital transceiver module 4 correspond to the dual-polarized row feeds 3 in a one-to-one manner. That is, each row feed is connected to one channel of the digital transceiver module 4. The digital transceiver module 4 implements the following functions:

(1) During transmission, a direct digital synthesizer (DDS) generates, up-converts, and amplifies transmit excitation signals, and a row feed network sends the signals to transmit channels of the transceiver module to generate high-power transmit signals.

(2) During reception, signals received by the dual-polarized antenna are synthesized by the feed network and transmitted to the receive channels of the digital transceiver module 4. The signals are converted to digital receive signals after amplification, filtering, down-conversion, and ND sampling. The digital receive signals are transmitted to a software-oriented information processing module 5 through an optical fiber.

(3) Electronic beam scanning in elevation of an arc phased array is implemented by gating elevation-direction channels of the digital T/R components.

(4) Multi-beam reception in the elevation direction is implemented by using a digital beamformer (DBF) in the software-oriented information processing module 5.

The dual-channel digital T/R component includes a digital receiving unit and a digital transmitting unit. The digital transmitting unit is preferably an all-solid-state transmitter, but is not limited to this. The digital receiving unit is a signal receiving component that matches the digital transmitting unit. Any digital receiver capable of receiving digital signals in this field can be used as the digital receiving unit in the present disclosure. However, a digital receiving patch is preferably used in the present disclosure.

The digital transmitting unit is configured to generate a frequency-modulated signal or a phase-coded signal required for detecting a target. The digital receiving unit is configured to receive an echo signal reflected by the target.

In the present disclosure, to implement electronic scanning in the range of −2° to +182° in the elevation direction, each of the dual-polarized row feeds needs to include a plurality of inner-row-feed subarrays. Each of the inner-row-feed subarrays includes an electronic switch and a plurality of antenna radiating elements. Adjacent antenna radiating elements may be arranged in a rectangular or triangular shape.

The electronic switch is connected to the antenna radiating elements. The electronic switch is configured to turn on or off the antenna radiating elements. In this way, electronic scanning ranges at different angles are formed in the elevation (vertical) direction by turning on different antenna radiating elements.

In the present disclosure, mechanical scanning is adopted in the horizontal direction. To implement a 360° rotating scan in the horizontal direction, the dual-polarized phased array antenna provided in the present disclosure needs to further include a driver module.

The driver module is connected to the support frame 2 for driving the support frame 2 to rotate in a horizontal 360° range.

The driver module (a servo drive system in FIG. 2) includes a drive motor, an angle encoder, and a motor control unit.

Both the angle encoder and the drive motor are connected to the motor control unit.

The motor control unit is configured to control the drive motor to drive the support frame 2 to rotate to a specified angle or position based on angle information in the angle encoder.

Figure 6:
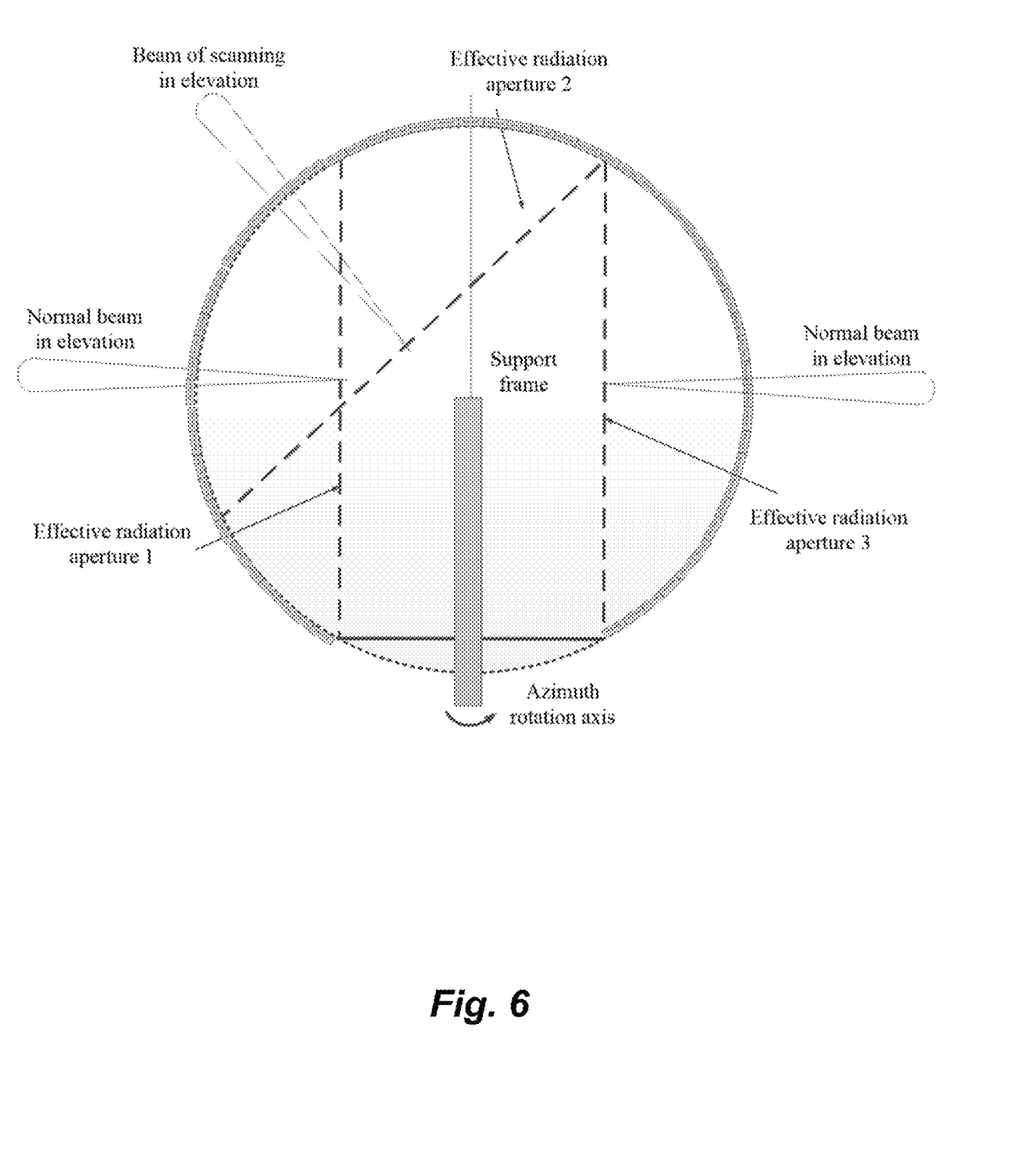
FIG. 6 is a schematic diagram of radar beam transmission according to the present disclosure.

FIG. 6 shows a radar beam transmission path for implementing 360° continuous scanning in the horizontal direction and electronic scanning in the range of −2° to +182° in the elevation direction.

Figure 7:
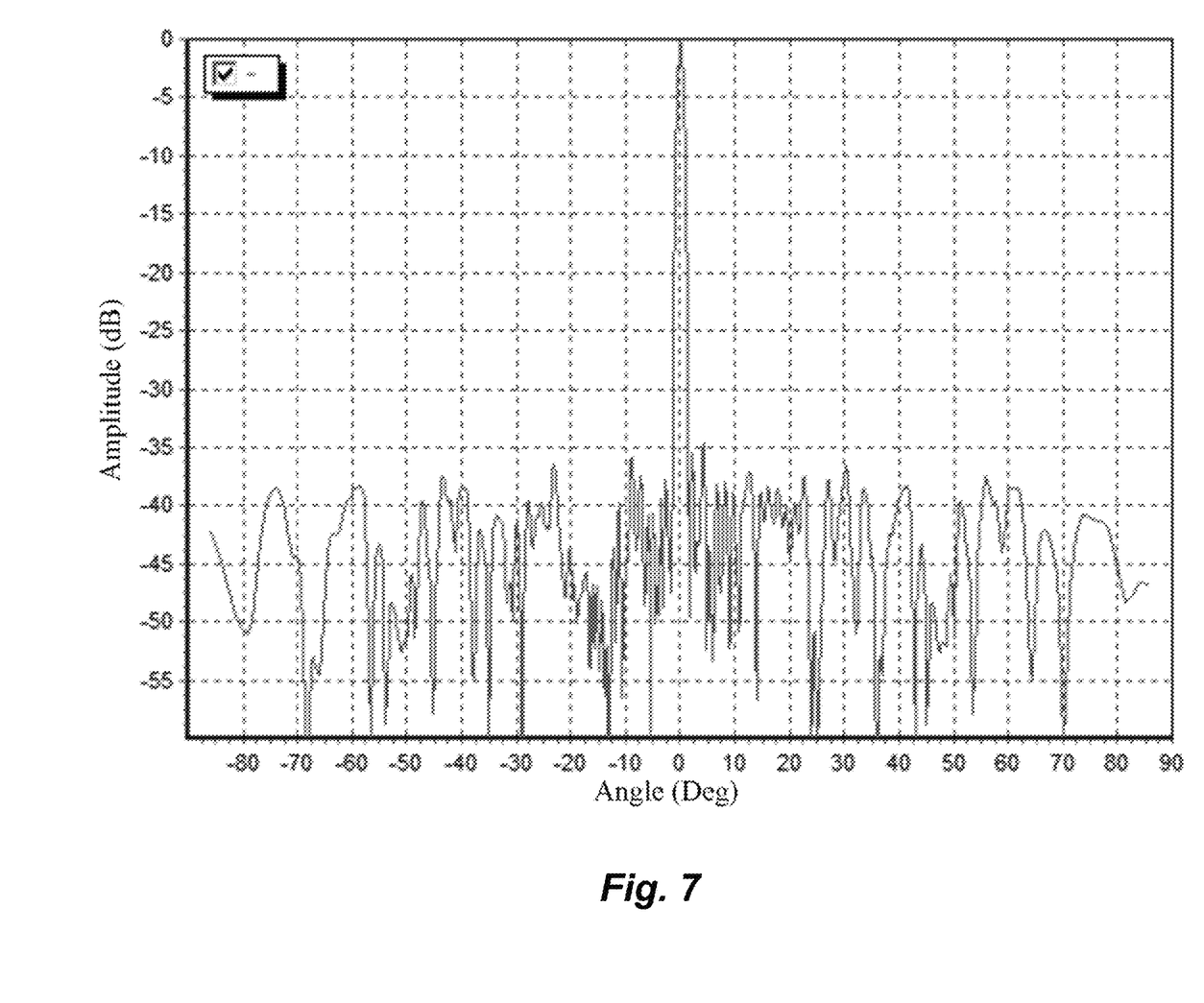
FIG. 7 is a directivity pattern of a horizontal row-feed beam in azimuth of a dual-polarized row feed according to an example of the present disclosure.

The dual-polarized phased array antenna in a horizontal cylindrical shape provided in the present disclosure is a dual-polarized microstrip patch (dual-polarized row feed 3) antenna or a dual-polarized waveguide slot antenna (dual-polarized row feed 3). It can implement simultaneous transmission and reception of two polarized signals in horizontal and vertical directions. The dual-polarized row feeds 3 are arranged at equal intervals in the azimuth direction to form a horizontal linear array. The row feed network implements Taylor amplitude weighting to ensure that the antenna sidelobe in azimuth is lower than −30 dB or less (as shown in FIG. 7).

In a dual polarization operation, the transmit waveform of horizontal polarization can be the same as that of vertical polarization. Alternatively, orthogonal coding can be adopted to improve the isolation between two channels in the dual polarization operation.

Figure 2:
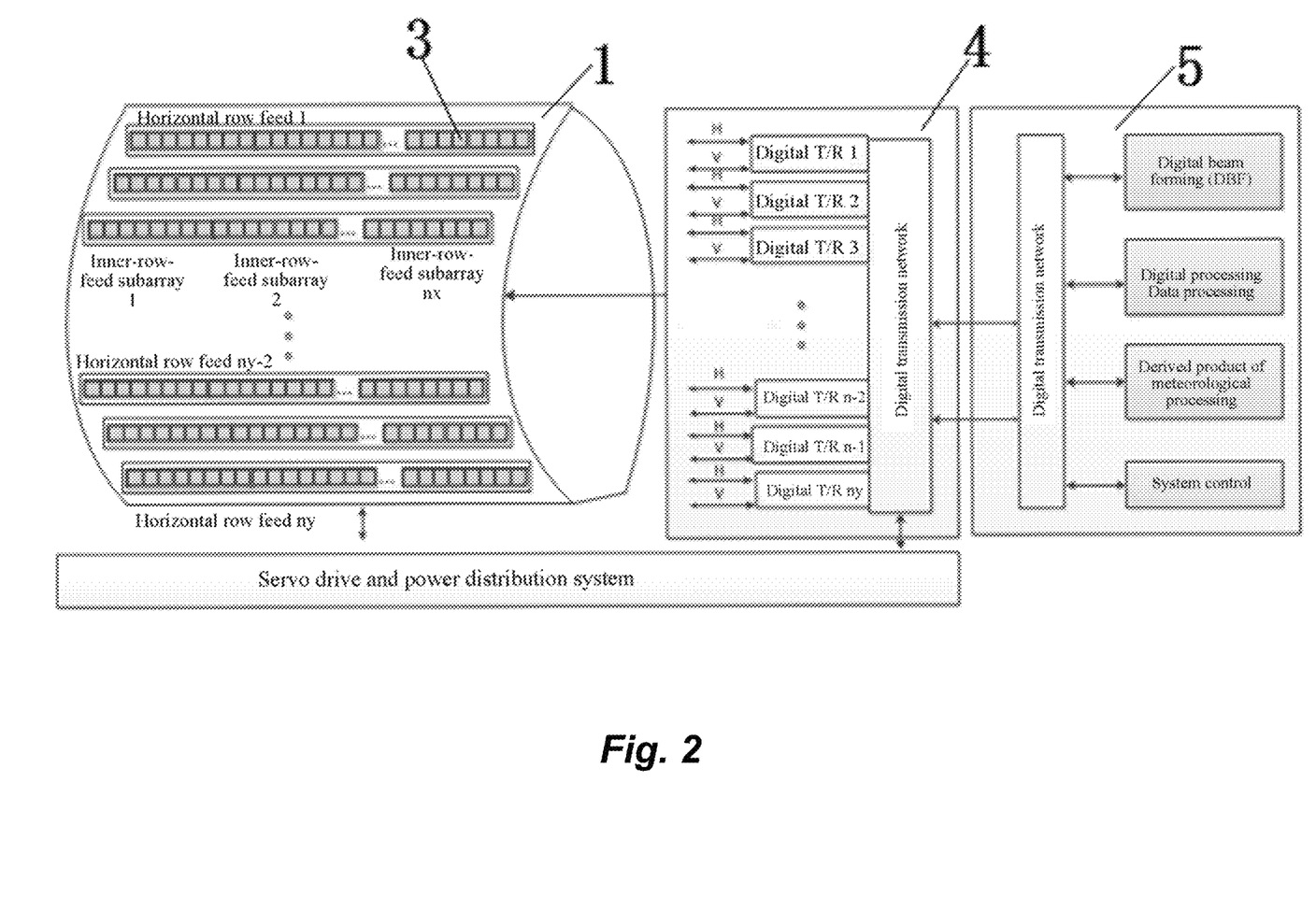
FIG. 2 is a schematic structural diagram of a dual-polarized phased array weather radar according to the present disclosure.
Figure 3:
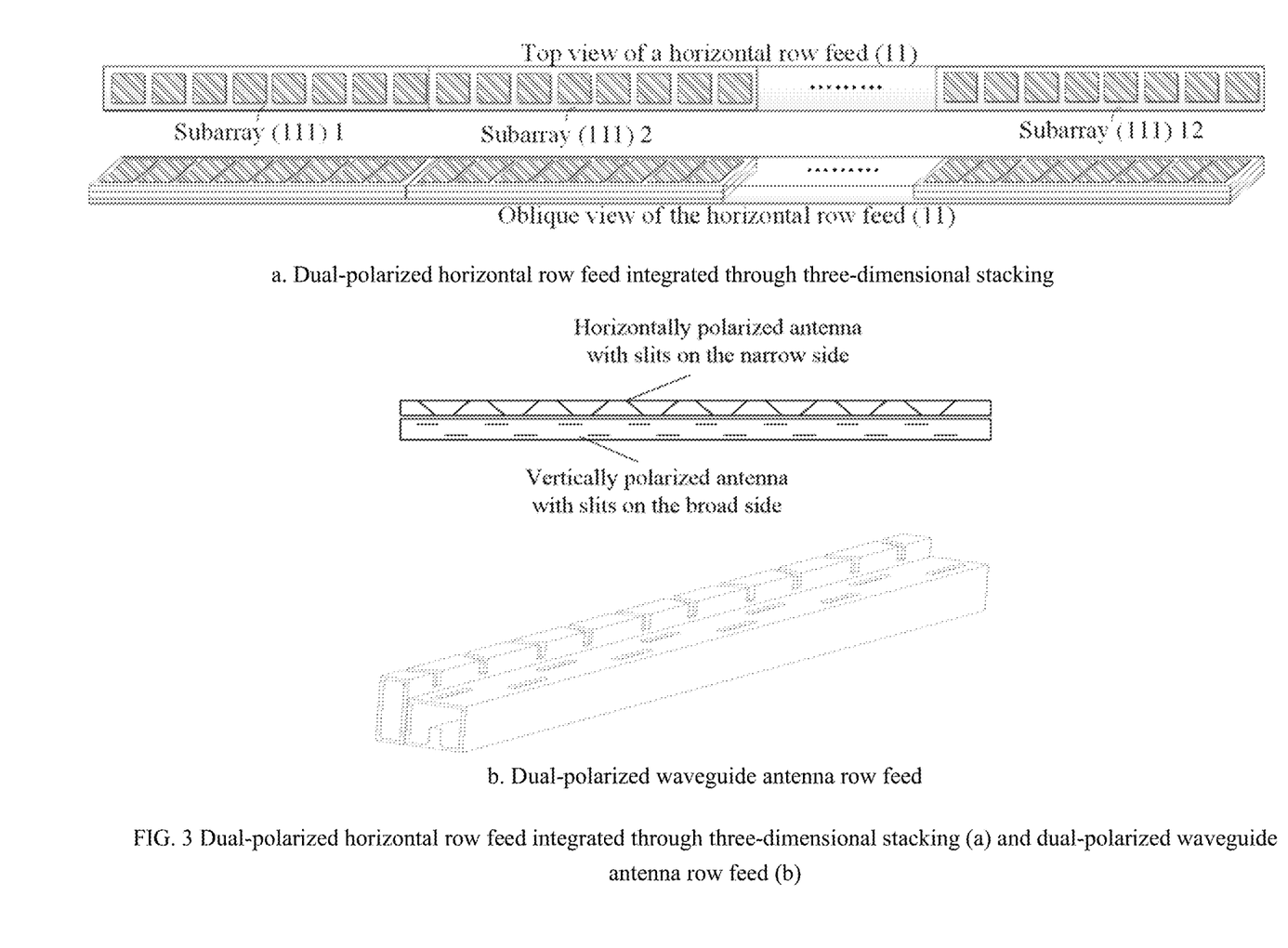
FIG. 3 illustrates a dual-polarized horizontal row feed integrated through three-dimensional stacking and a dual-polarized waveguide antenna row feed according to the utility model.
Figure 4A:
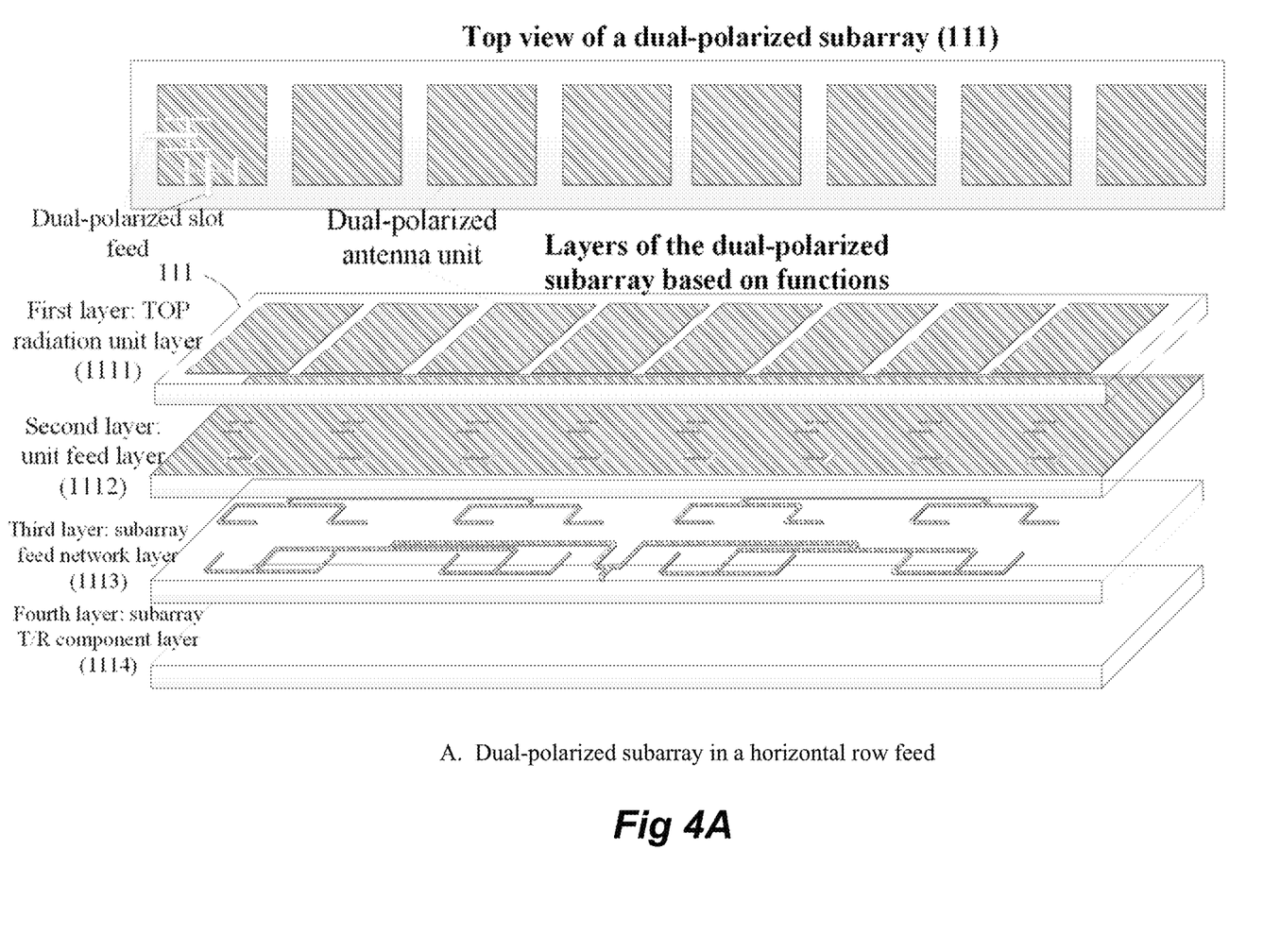
FIGS. 4A and 4B illustrate a dual-polarized subarray in a horizontal row feed and a dual-polarized slot antenna in a waveguide row feed according to the utility model.
Figure 4B:
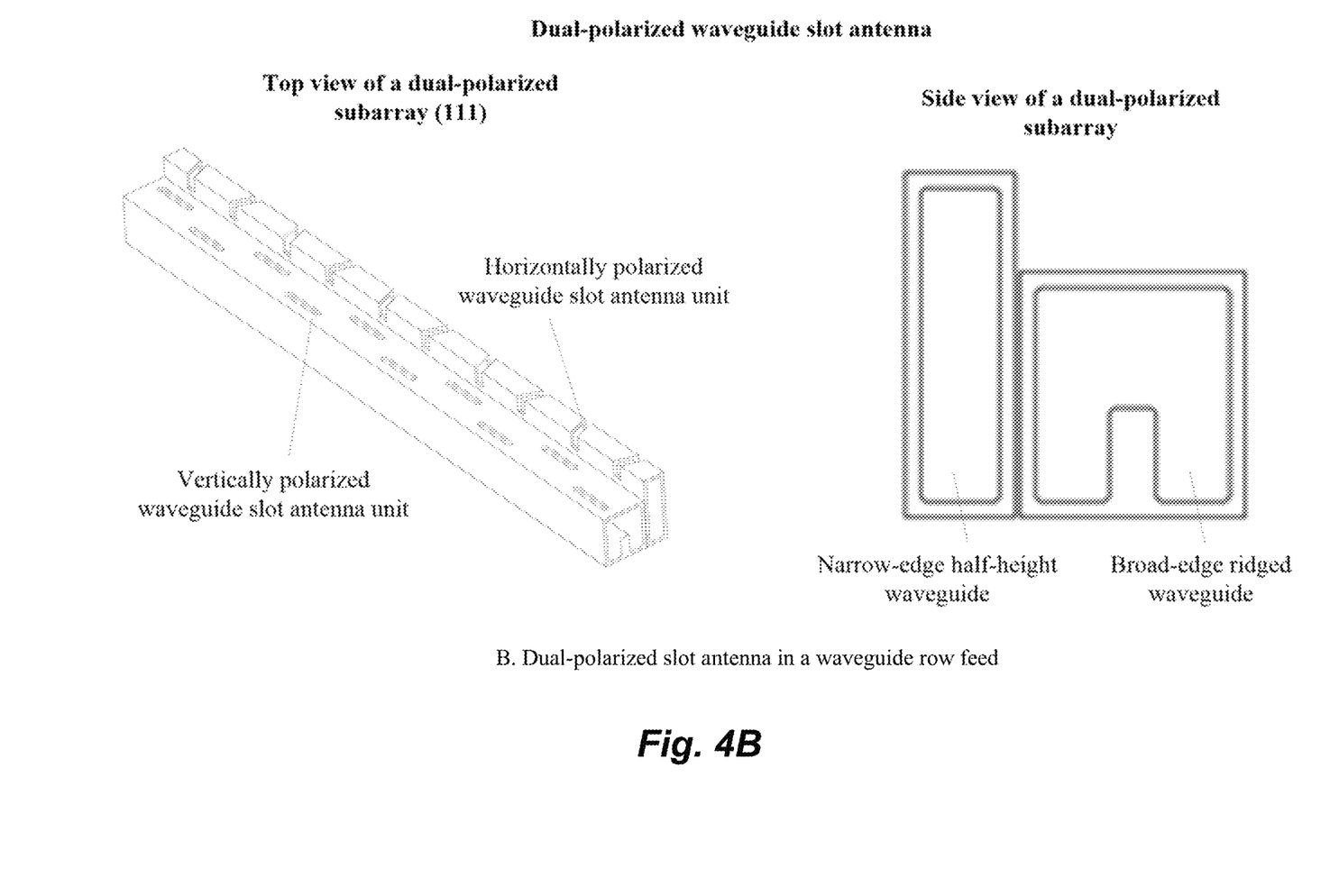

In another embodiment of the present disclosure, the present disclosure further provides a dual-polarized phased array weather radar including the dual-polarized phased array antenna. A pulse compression Doppler system is used for the dual-polarized phased array weather radar. As shown in FIG. 2, the dual-polarized phased array weather radar further includes an information processing module 5.

The information processing module 5 is connected to the dual-polarized phased array antenna and configured to complete spectrum analysis to obtain target echo information based on a signal received by the dual-polarized phased array antenna. The information processing module 5 is further configured to generate a control instruction to drive the dual-polarized phased array antenna to collect signals in the horizontal direction and/or the elevation direction.

The information processing module 5 is connected to the electronic switch in the dual-polarized phased array antenna and configured to control the electronic switch to be on or off. The dual-polarized phased array antenna forms electronic scans at different angles in the elevation direction based on an area in which the electronic switch is turned on.

In addition, the information processing module 5 may further include a timing unit to generate an entire-machine timing signal of the dual-polarized phased array weather radar and an excitation signal to be sent to the transmitting module in the dual-polarized phased array antenna.

The information processing module 5 includes a multi-channel DBF module, a signal processing module, and a communication module.

The multi-channel DBF module is connected to the signal processing module. The signal processing module is connected to the communication module.

The multi-channel DBF module receives multi-channel receive signals (signals transmitted by a plurality of horizontal row feeds) from the digital transceiver module 4 in the dual-polarized phased array antenna, forms a single-beam or multi-beam signal, and then sends the single-beam or multi-beam signal to the signal processing module. The signal processing module processes the single-beam or multi-beam signal to complete spectrum analysis. Because the spectrum analysis is the prior art, details are not provided herein in the present disclosure.

In a preferred example of the present disclosure, a box 6 can be further arranged on the support frame 2 of the dual-polarized phased array antenna provided in the present disclosure, as shown in FIG. 5. The information processing module 5 can be placed in the box 6 to avoid external interference.

The support frame 2 may be secured in different ways depending on geographical conditions of a location to be measured. In the present disclosure, it is preferable to securing the support frame 2 by using rivets.

In addition, the dual-polarized phased array weather radar provided in the present disclosure further includes a power distribution system configured to supply electrical energy to the entire radar. The power distribution system is preferably a solar power supply system or a mains power supply system.

The following describes a specific operation process of the dual-polarized phased array weather radar and the dual-polarized phased array antenna provided in the present disclosure by selecting one-dimensional horizontal row feeds as the dual-polarized row feeds 3.

The dual-polarized phased array antenna of the present disclosure has a horizontal cylindrical structure, with 258 one-dimensional dual-polarized horizontal linear array row feeds arranged in the elevation direction on the cylindrical arc surface. Each 112 adjacent row feeds form an effective radiation aperture, which can implement beam scanning in elevation at an angle less than or equal to 1°. The scan range of the entire antenna is −2° to 182°.

First, the signal processing module receives an external instruction or sets operation parameters based on built-in parameters of the radar, generates a timing signal required for entire machine operation based on the received external instruction or the operation parameters set based on the built-in parameters, and controls the radar to enter an operation mode.

Under the action of the modulated pulse (excitation signal) generated by the signal processing module, the signal transmitting unit transmits a frequency-modulated or phase-coded signal required for the radar to detect a target, up-converts the signal to the operation band of the radar, and then performs power amplification on the signal. Then the dual-polarized phased array antenna radiates the signal. The transmitted excitation signal is in the form of electromagnetic wave. After encountering the target, the electromagnetic wave is backscattered to form an echo signal. The digital receiving unit in the dual-polarized phased array antenna receives the returned echo signal. The digital transceiver module 4 performs low-noise amplification, filtering, down-conversion to the digital intermediate frequency, and AD sampling on the echo signal. Then the processed signal is transmitted to the multi-channel DBF module. A receive beam signal is formed in the DBF module. The signal processing module performs spectrum analysis to obtain target echo information. Finally, the communication module transmits the echo information to a designated location (which may be a remote terminal).

In the operation process of the weather radar provided in the present disclosure, a pulse compression system is used to give consideration to both range resolution and operating distance. Waveforms of the excitation signal are in linear frequency-modulated pulse, nonlinear frequency-modulated pulse, and phase-coded pulse modes. The bandwidth is 5 MHz, the range resolution reaches 30 m, and the pulse width is adjustable in the range of 0.5 μs to 200 μs. After pulse compression, a range sidelobe can be reduced by using a frequency domain weighting method when the signal processing module performs signal processing.

Figure 8:
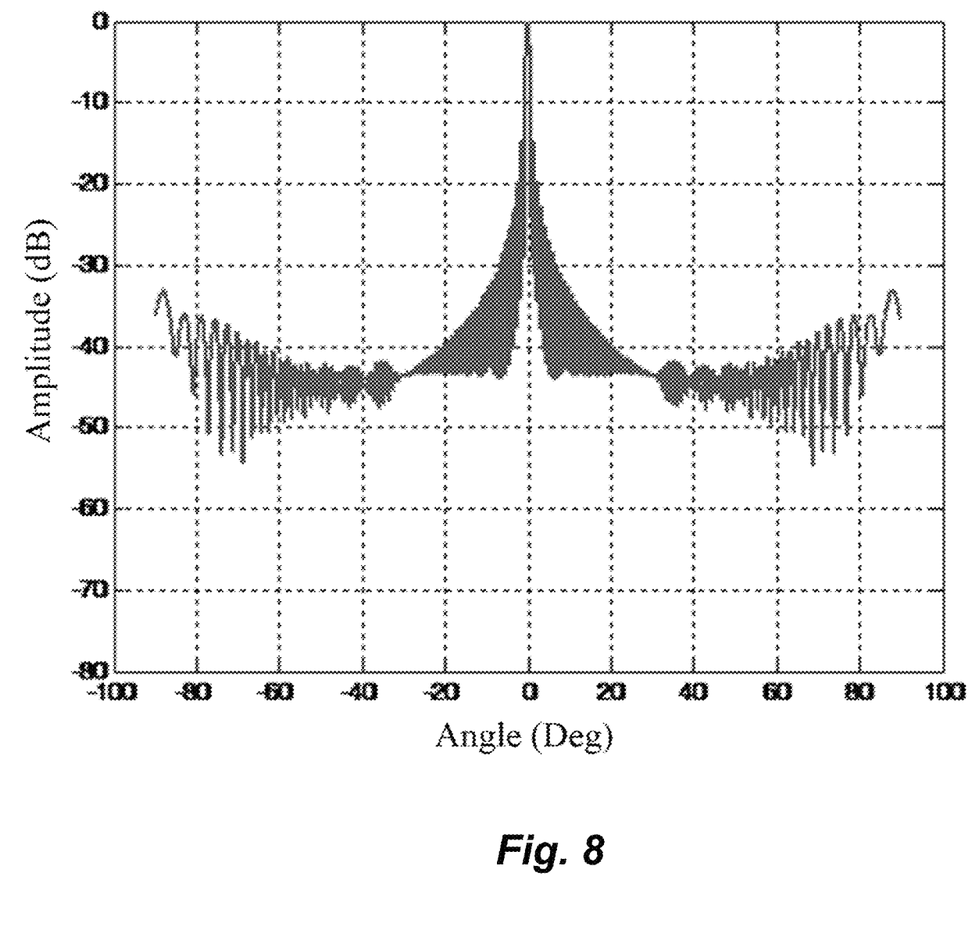
FIG. 8 is a directivity pattern of a transmit beam in elevation according to an example of the present disclosure.
Figure 9:
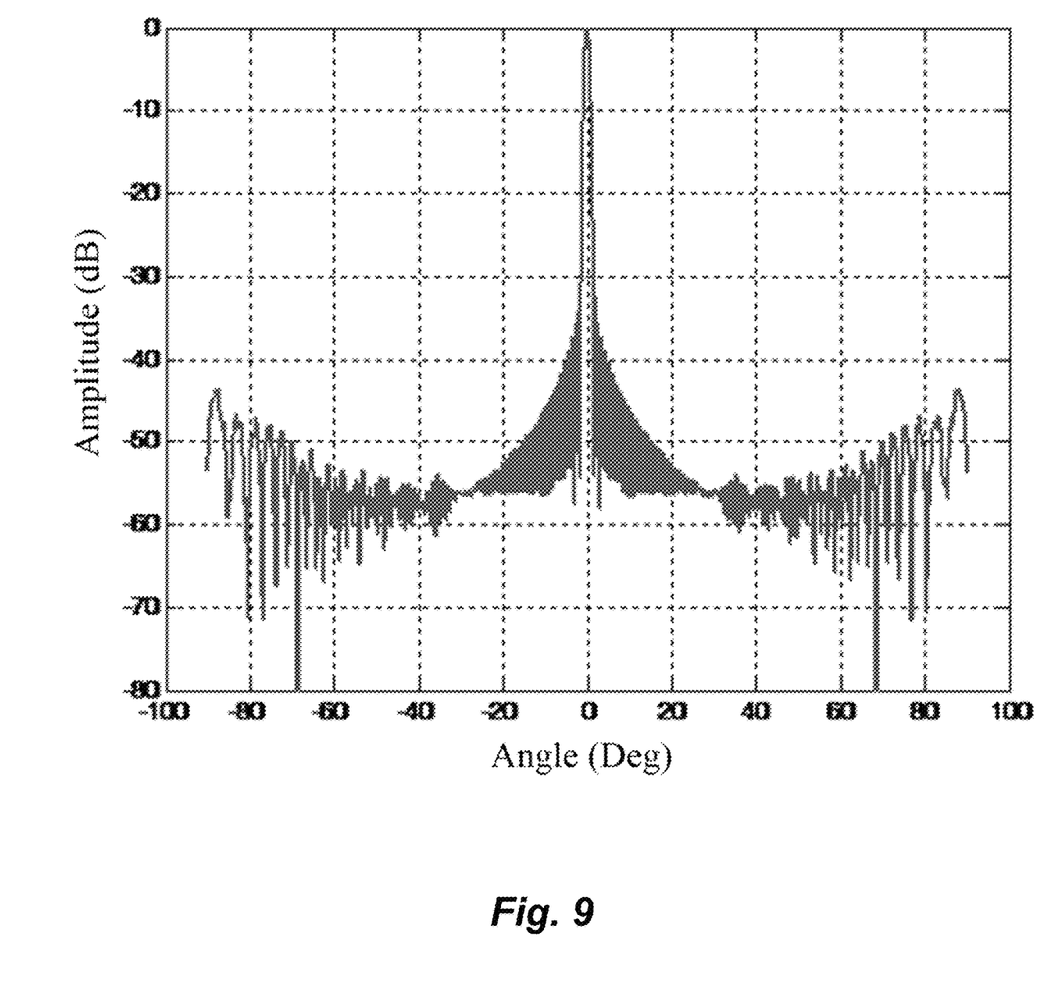
FIG. 9 is a directivity pattern of a receive beam in elevation according to an example of the present disclosure.

To ensure an electromagnetic wave with the highest possible radiation level, the sidelobe is not reduced through amplitude and phase weighting when the dual-polarized phased array antenna provided in the present disclosure is used to transmit a signal, as shown in FIG. 8. During reception, to ensure that the maximum sidelobe level is less than or equal to −30 dB or lower, the sidelobe needs to be reduced through amplitude and phase weighting, as shown in FIG. 9.

Compared with an existing planar phased array weather radar, the dual-polarized phased array weather radar including the dual-polarized phased array antenna in the horizontal cylindrical shape provided in the present disclosure has the following advantages:

1. Adopting dual-polarized row feeds can improve the beam scanning performance of the phased array weather radar, and achieve digital multi-beam signals with constant beamwidth, antenna gain, and dual polarization performance. This ensures consistency of weather detected at different scan angles, and improves the accuracy of weather target 3D construction.
2. Electronic scanning in the range of −2° to 182° can be implemented by controlling areas in which the dual-polarized row feeds are turned on or off. This further shortens the full-airspace detection time of the phased array weather radar, and improves the capabilities of the phased array weather radar to identify particle phase states and weather characteristics.
3. The dual-polarized phased array antenna in the horizontal cylindrical shape simplifies the calibration requirement of the phased array weather radar, improves the usability and adaptability of the radar, and facilitates radar upgrade and application range extension.

Each example of the present specification is described in a progressive manner, each example focuses on the difference from other examples, and the same and similar parts between the examples may refer to each other.

In this specification, specific examples are used for illustrating the principles and implementations of the present disclosure. The description of the foregoing examples is merely used to help understand the method and the core idea of the present disclosure. In addition, a person skilled in the art can make various modifications in terms of specific implementations and scope of application in accordance with the idea of the present disclosure. In conclusion, the content of the present specification shall not be construed as a limitation to the present disclosure.

All of the above U.S. patents, U.S. patent application publications, U.S. patent applications, foreign patents, foreign patent applications and non-patent publications referred to in this specification and/or listed in the Application Data Sheet, including but not limited to China Patent Application No. 202010533983.0 filed Jun. 12, 2020 is incorporated herein by reference, in its entirety.

From the foregoing it will be appreciated that, although specific embodiments have been described herein for purposes of illustration, various modifications may be made without deviating from the spirit and scope of the invention. For example, the methods and systems discussed herein are applicable to other architectures differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A dual-polarized phased array antenna, comprising:
a horizontal cylindrical support surface;
a support frame;
a plurality of dual-polarized row feeds; and
a driver module,
wherein the support frame matches the horizontal cylindrical support surface, and the support frame is configured to support the horizontal cylindrical support surface;
wherein the plurality of dual-polarized row feeds are arranged on the horizontal cylindrical support surface, and the plurality of dual-polarized row feeds are closely arranged along a circumferential direction of the horizontal cylindrical support surface; and
wherein the driver module comprises a drive motor, an angle encoder, and a motor control unit, wherein both the angle encoder and the drive motor are connected to the motor control unit, and wherein the motor control unit is configured to control the drive motor to drive the support frame to rotate to a specified angle based on angle information in the angle encoder.

2. The dual-polarized phased array antenna according to claim 1, further comprising:
a digital transceiver module, wherein the digital transceiver module comprises a plurality of dual-channel digital transmit/receive (T/R) components; and each of the dual-polarized row feeds corresponds to one of the dual-channel digital T/R components, and the dual-channel digital T/R components are configured to receive and transmit signals.

3. The dual-polarized phased array antenna according to claim 2 wherein the dual-channel digital T/R component comprises a digital receiving unit and a digital transmitting unit, wherein the digital transmitting unit is configured to generate a frequency-modulated signal or a phase-coded signal required for detecting a target, and wherein the digital receiving unit is configured to receive an echo signal reflected by the target.

4. The dual-polarized phased array antenna according to claim 3 wherein the digital transmitting unit is an all-solid-state transmitter.

5. The dual-polarized phased array antenna according to claim 1 wherein each of the dual-polarized row feeds comprises a plurality of inner-row-feed subarrays, and each of the inner-row-feed subarrays comprises an electronic switch and a plurality of antenna radiating elements, and wherein the electronic switch is connected to the antenna radiating elements and configured to turn on or off the antenna radiating elements.

6. The dual-polarized phased array antenna according to claim 1,
wherein the driver motor is connected to the support frame for driving the support frame to rotate horizontally.

7. A dual-polarized phased array weather radar, comprising:
an information processing module; and
a dual-polarized phased array antenna comprising:
a horizontal cylindrical support surface;
a support frame;
a plurality of dual-polarized row feeds; and
a driver module;
wherein the support frame matches the horizontal cylindrical support surface, and the support frame is configured to support the horizontal cylindrical support surface, wherein the plurality of dual-polarized row feeds are arranged on the horizontal cylindrical support surface, and wherein the plurality of dual-polarized row feeds are closely arranged along a circumferential direction of the horizontal cylindrical support surface,
wherein the driver module comprises a drive motor, an angle encoder, and a motor control unit, wherein both the angle encoder and the drive motor are connected to the motor control unit, and wherein the motor control unit is configured to control the drive motor to drive the support frame to rotate to a specified angle based on angle information in the angle encoder, and
wherein the information processing module is connected to the dual-polarized phased array antenna and configured to complete spectrum analysis to obtain target echo information based on a signal received by the dual-polarized phased array antenna, and the information processing module is further configured to generate a control instruction to drive the dual-polarized phased array antenna to collect signals in a horizontal direction and/or an elevation direction.

8. The dual-polarized phased array weather radar according to claim 7, further comprising a digital transceiver module,
wherein the digital transceiver module comprises a plurality of dual-channel digital transmit/receive (T/R) components, wherein each of the dual-polarized row feeds corresponds to one of the dual-channel digital T/R components, and wherein the dual-channel digital T/R components are configured to receive and transmit signals.

9. The dual-polarized phased array weather radar according to claim 8, the dual-channel digital T/R component comprising:
a digital receiving unit; and
a digital transmitting unit, wherein the digital transmitting unit is configured to generate a frequency-modulated signal or a phase-coded signal required for detecting a target, and the digital receiving unit is configured to receive an echo signal reflected by the target.

10. The dual-polarized phased array weather radar according to claim 9, wherein the digital transmitting unit is an all-solid-state transmitter.

11. The dual-polarized phased array weather radar according to claim 7, wherein each of the dual-polarized row feeds comprises a plurality of inner-row-feed subarrays, and wherein each of the inner-row-feed subarrays comprises an electronic switch and a plurality of antenna radiating elements, and wherein the electronic switch is connected to the antenna radiating elements and configured to turn on or off the antenna radiating elements.

12. The dual-polarized phased array weather radar according to claim 7, wherein the driver motor is connected to the support frame for driving the support frame to rotate horizontally.

13. The dual-polarized phased array weather radar according to claim 7, wherein the information processing module is connected to the electronic switch in the dual-polarized phased array antenna and configured to control the electronic switch to be on or off, and the dual-polarized phased array antenna forms electronic scans at different angles in the elevation direction based on an area in which the electronic switch is turned on.

14. The dual-polarized phased array weather radar according to claim 8, wherein the information processing module is connected to the electronic switch in the dual-polarized phased array antenna and configured to control the electronic switch to be on or off, and the dual-polarized phased array antenna forms electronic scans at different angles in the elevation direction based on an area in which the electronic switch is turned on.

15. The dual-polarized phased array weather radar according to claim 9, wherein the information processing module is connected to the electronic switch in the dual-polarized phased array antenna and configured to control the electronic switch to be on or off, and the dual-polarized phased array antenna forms electronic scans at different angles in the elevation direction based on an area in which the electronic switch is turned on.

16. The dual-polarized phased array weather radar according to claim 10, wherein the information processing module is connected to the electronic switch in the dual-polarized phased array antenna and configured to control the electronic switch to be on or off, and the dual-polarized phased array antenna forms electronic scans at different angles in the elevation direction based on an area in which the electronic switch is turned on.

17. The dual-polarized phased array weather radar according to claim 11, wherein the information processing module is connected to the electronic switch in the dual-polarized phased array antenna and configured to control the electronic switch to be on or off, and the dual-polarized phased array antenna forms electronic scans at different angles in the elevation direction based on an area in which the electronic switch is turned on.

18. The dual-polarized phased array weather radar according to claim 7, the information processing module comprising:
   a multi-channel digital beam forming (DBF) module;
   a signal processing module; and
   a communication module,
   wherein the multi-channel DBF module is connected to the signal processing module, and the signal processing module is connected to the communication module, and wherein the multi-channel DBF module is configured to convert an echo signal received by the dual-polarized phased array antenna to a beam signal, wherein the signal processing module is configured to perform spectrum analysis on the beam signal to obtain target echo information, and wherein the communication module is configured to send the target echo information.

\* \* \* \* \*